US009571799B2

(12) United States Patent
Ooi

(10) Patent No.: US 9,571,799 B2
(45) Date of Patent: Feb. 14, 2017

(54) WIRELESS COMMUNICATION SYSTEM AND METHOD, AND DATA RECEIVING APPARATUS, METHOD AND PROGRAM

(71) Applicant: PANASONIC CORPORATION, Osaka (JP)

(72) Inventor: Kenji Ooi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 527 days.

(21) Appl. No.: 13/792,938

(22) Filed: Mar. 11, 2013

(65) Prior Publication Data

US 2013/0250120 A1   Sep. 26, 2013

(30) Foreign Application Priority Data

Mar. 26, 2012   (JP) ................................. 2012-068648

(51) Int. Cl.
*H04N 7/18* (2006.01)
(52) U.S. Cl.
CPC .................................... *H04N 7/181* (2013.01)
(58) Field of Classification Search
CPC ......... H04N 7/181; H04N 5/232; H04N 5/247
USPC ............................. 348/159, 39, 143, 153, 154
See application file for complete search history.

(56) References Cited

U.S. PATENT DOCUMENTS

| 2001/0013128 A1* | 8/2001 | Hagai ................ H04N 7/17318 725/90 |
| 2001/0025301 A1* | 9/2001 | Anderson ...................... 709/207 |
| 2010/0194894 A1* | 8/2010 | Odaka et al. ................. 348/159 |
| 2012/0019657 A1* | 1/2012 | Lee ............................... 348/143 |
| 2012/0314633 A1* | 12/2012 | Morioka ....................... 370/310 |
| 2013/0063659 A1 | 3/2013 | Takahashi |

FOREIGN PATENT DOCUMENTS

| JP | 2002-171262 | 6/2002 |
| JP | 2003-289528 | 10/2003 |
| JP | 2011-29969 | 2/2011 |
| JP | 2012-209731 | 10/2012 |
| JP | 2013-058986 | 3/2013 |

OTHER PUBLICATIONS

Office Action issued in Japan Patent Appl. No. 2013-045600, dated Jan. 12, 2016.

* cited by examiner

*Primary Examiner* — Thai Tran
*Assistant Examiner* — Nien-Ru Yang
(74) *Attorney, Agent, or Firm* — Greenblum & Bernstein, P.L.C.

(57) ABSTRACT

An access point is connected with surveillance cameras through wireless communication means. In the access point, a packet identification unit identifies the surveillance camera. A receiving status measurement unit measures receiving speed of the image data for each surveillance camera, and a priority apparatus determination unit determines whether to prioritize receiving of image data from a surveillance camera with the receiving speed smaller than a reference speed. The receiving control unit transmits a CTS packet, indicating that data receiving from the surveillance camera determined by the priority apparatus determination unit will be prioritized, to all of the connected surveillance cameras. The surveillance cameras other than that indicated by the CTS packet pause the data transmission to the access point when the CTS packet is received.

13 Claims, 5 Drawing Sheets

| ID Information | Reference Speed | Reception Speed |
|---|---|---|
| 001 | 512 kbps | 868 kbps |
| 002 | 256 kbps | 168 kbps |
| 003 | 128 kbps | 378 kbps |
| ⋮ | ⋮ | ⋮ |
| $N_1$ | $N_2$ | $N_3$ |

Figure 2

WIRELESS COMMUNICATION SYSTEM AND METHOD, AND DATA RECEIVING APPARATUS, METHOD AND PROGRAM

BACKGROUND OF THE INVENTION

Field of the Invention

The present invention relates to a wireless communication system for receiving data transmitted from a plurality of transmitting apparatuses through wireless communication means.

Description of the Related Art

In a known surveillance camera system, each of a plurality of surveillance cameras takes an image of a monitored object, and the captured images are output to a monitor at the same time to display the captured images. In the conventional surveillance camera system, video signals obtained by image capture by use of the surveillance cameras are compressed in, for example, H.264 format and are then divided into RTP (Real time Transport Protocol) packets. The RTP packets are transmitted to a receiving apparatus through a wireless communication network, and the receiving apparatus transmits the RTP packets to a plurality of decoders to decode the RTP packets. Decoded captured images are combined and displayed on the monitor, thereby it is possible to display the monitored images of plural points at the same time.

The communication environment in the wireless communication network always changes because of some factors such as obstacles and weather change. Therefore, RTP packets from a plurality of surveillance cameras may not be transmitted to the receiving apparatus at the same time, and for example, the transfer of the RTP packets from a surveillance camera may be delayed. In the event of such transmission delay, monitored images displayed on the monitor are deviated. For example, the monitored images from a plurality of surveillance cameras to capture images at different points may display the same object.

In a video monitoring system described in Japanese Patent Laid-Open No. 2011-29969, an NTP (Network Time Protocol) or the like is used to hold common time information between a plurality of surveillance cameras. The common time information is added to image data obtained by imaging, and then the image data is transmitted. A receiving apparatus synchronizes the transmitted image data based on the added time information to prevent a deviation in the display time.

According to the technique described in the above Japanese Patent Laid-Open No. 2011-29969, a time synchronization process between the surveillance cameras is necessary before the system starts the operation, and the time synchronization process is necessary again when the time information between these surveillance cameras is deviated. This complicates the system operation. In the technique described in Japanese Patent Laid-Open No. 2011-29969, in order to realize simultaneous display of the early-transmitted image and late-transmitted image, the decoder needs to include a buffer that holds early-transmitted image data, which may cause increase in the system cost.

The present invention has been made in view of the foregoing circumstances, and an object of the present invention is to provide a wireless communication system that reproduces and displays video data transmitted from a plurality of wireless terminals, wherein transmission of a plurality of video data can be synchronized based on a simple configuration.

SUMMARY OF THE INVENTION

The present invention provides a wireless communication system plurality of transmitting apparatuses and at least one receiving apparatus for transmitting transmission data from the transmitting apparatus to the receiving apparatus. The receiving apparatus comprises a communication control unit, a receiving status monitoring unit and a priority apparatus determination unit. The communication control unit receives transmission data from the transmitting apparatuses and transmits control data to the transmitting apparatuses. The receiving status monitoring unit monitors receiving status of the transmission data for each of the transmitting apparatuses. The priority apparatus determination unit determines a priority apparatus to prioritize receiving of the transmission data based on the receiving status of the transmission data. The receiving apparatus transmits the control data to all of the transmitting apparatuses, the control data indicating that the receiving of the transmission data from the priority apparatus will be prioritized.

According to the configuration, the receiving apparatus preferentially receives only the transmission data from a specific transmitting apparatus according to the status of receiving from the plurality of transmitting apparatuses. Therefore, the transmission of a plurality of video data can be synchronized based on a simple configuration.

The transmitting apparatuses other than the priority apparatus suspend data transmission to the receiving apparatus when the control data is received. According to the configuration, it is possible to synchronize transmission of a plurality of video data and to lower power consumption of the whole system because the transmitting apparatuses other than the priority apparatus pauses data transmission.

The receiving status monitoring unit monitors receiving status based on at least one of the receiving speed of the transmission data, radio wave receiving status and header information in a transmission packet for each of the transmitting apparatuses. According to this configuration, it is possible to ensure to synchronize data transmission from plural transmitting apparatuses with a simple configuration.

In the event of monitoring the receiving status based on the receiving speed, the receiving status monitoring unit monitors the receiving status based on comparison between the receiving speed and a predetermined value that is set for each of the plurality of transmitting apparatuses. According to this configuration, it is possible to ensure to synchronize data transmission from plural transmitting apparatuses even if the system is configured with transmitting apparatuses with different transmission speeds.

The priority apparatus determination unit sets a priority receiving period for preferentially receiving the transmission data. According to the configuration, the priority period can be set only for a period necessary for the synchronization.

In the wireless communication system according to the present invention, the transmitting apparatus may be a surveillance camera that images an object to be monitored to generate image data, and the receiving terminal may be an access point that receives the image data from the plural surveillance cameras.

A wireless communication system according to the present invention comprises plurality of transmitting apparatuses and at least one receiving apparatus for transmitting transmission data from the transmitting apparatus to the receiving apparatus. The receiving apparatus comprises a communication control unit, a receiving status monitoring unit and a priority apparatus determination unit. The communication control unit receives transmission data from the transmitting apparatuses and transmits control data to the transmitting apparatuses. The receiving status monitoring unit monitors receiving status of the transmission data for each of the transmitting apparatuses. The priority apparatus determination unit determines a priority apparatus to prioritize receiving of the transmission data based on the receiving status of the transmission data. The receiving apparatus transmits the control data to all of the transmitting apparatuses, the control data indicating that the receiving of the transmission data from the priority apparatus will be prioritized.

According to the configuration, the receiving apparatus preferentially receives only the transmission data from a specific transmitting apparatus according to the status of receiving from the plurality of transmitting apparatuses. Therefore, the transmission of a plurality of video data can be synchronized based on a simple configuration.

A wireless communication system according to the present invention includes a plurality of transmitting apparatuses and at least one receiving apparatus connected through wireless communication means, and transmission data is transmitted from the transmitting apparatuses to the receiving apparatus. The transmitting apparatus comprises a data acquisition unit that acquires the transmission data, a communication control unit that transmits the transmission data to the receiving apparatus, and a delay status notification unit that outputs priority transmission data for requesting priority transmission if the transmission speed of the transmission data is smaller than the predetermined value. The receiving apparatus comprises a communication control unit that receives the transmission data and the priority transmission data from the transmitting apparatuses and that transmits control data to the transmitting apparatuses, and a priority apparatus determination unit that transmits the priority transmission data to determine whether to prioritize receiving of the transmission data from the transmitting apparatus. The control data is transmitted to all of the transmitting apparatuses, the control data indicating that the receiving of the transmission data from the transmitting apparatus determined by the priority apparatus determination unit will be prioritized.

A wireless communication method according to the present invention for transmitting transmission data from a transmitting apparatus to a receiving apparatus, comprises the steps of data acquisition step for acquiring the transmission data, data communication step for transmitting the transmission data to the receiving apparatus, data receiving step of receiving transmission data from the transmitting apparatuses, sender identification step of identifying the transmitting apparatus that has transmitted the transmission data, receiving status monitoring step for monitoring receiving status of the transmission data for each of the transmitting apparatuses, and step for determining a priority apparatus to prioritize receiving of the transmission data based on the receiving status of the transmission data, and for transmitting control data to all of the transmitting apparatuses, the control data indicating that the receiving of the transmission data from the priority apparatus will be prioritized.

A data receiving apparatus according to the present invention comprises a communication control unit, a sender identification unit, a receiving status monitoring unit, and a priority apparatus determination unit. The communication control unit receives transmission data from the transmitting apparatuses and that transmits control data to the transmitting apparatuses. The sender identification unit identifies the transmitting apparatus that has transmitted the transmission data. The receiving status monitoring unit monitors receiving status of the transmission data for each of the transmitting apparatuses. The priority apparatus determination unit determines a priority apparatus to prioritize receiving of the transmission data based on the receiving status of the transmission data. The data receiving apparatus transmits the control data to all of the transmitting apparatuses, the control data indicating that the receiving of the transmission data from the priority apparatus will be prioritized.

A data receiving method according to the present invention, for receiving transmission data from a plurality of transmitting apparatuses connected through wireless communication means, comprises data receiving step of receiving transmission data from the transmitting apparatuses, sender identification step of identifying the transmitting apparatus that has transmitted the transmission data, receiving status monitoring step for monitoring receiving status of the transmission data for each of the transmitting apparatuses; and priority apparatus determination step for determining a priority apparatus to prioritize receiving of the transmission data based on the receiving status of the transmission data, and data transmission step for transmitting the control data to all of the transmitting apparatuses, the control data indicating that the receiving of the transmission data from the priority apparatus will be prioritized.

The present invention provides a data receiving program executed by a receiving apparatus to execute the data receiving method.

According to the present invention, only the transmission data from a specific transmitting apparatus is preferentially received according to the status of receiving from a plurality of transmitting apparatuses. Therefore, the transmission of a plurality of video data can be synchronized based on a simple configuration.

BRIEF DESCRIPTION OF THE DRAWINGS

FIG. 2 is an explanatory diagram showing an example of a receiving status;

DETAILED DESCRIPTION OF THE PREFERRED EMBODIMENTS

Figure 1:
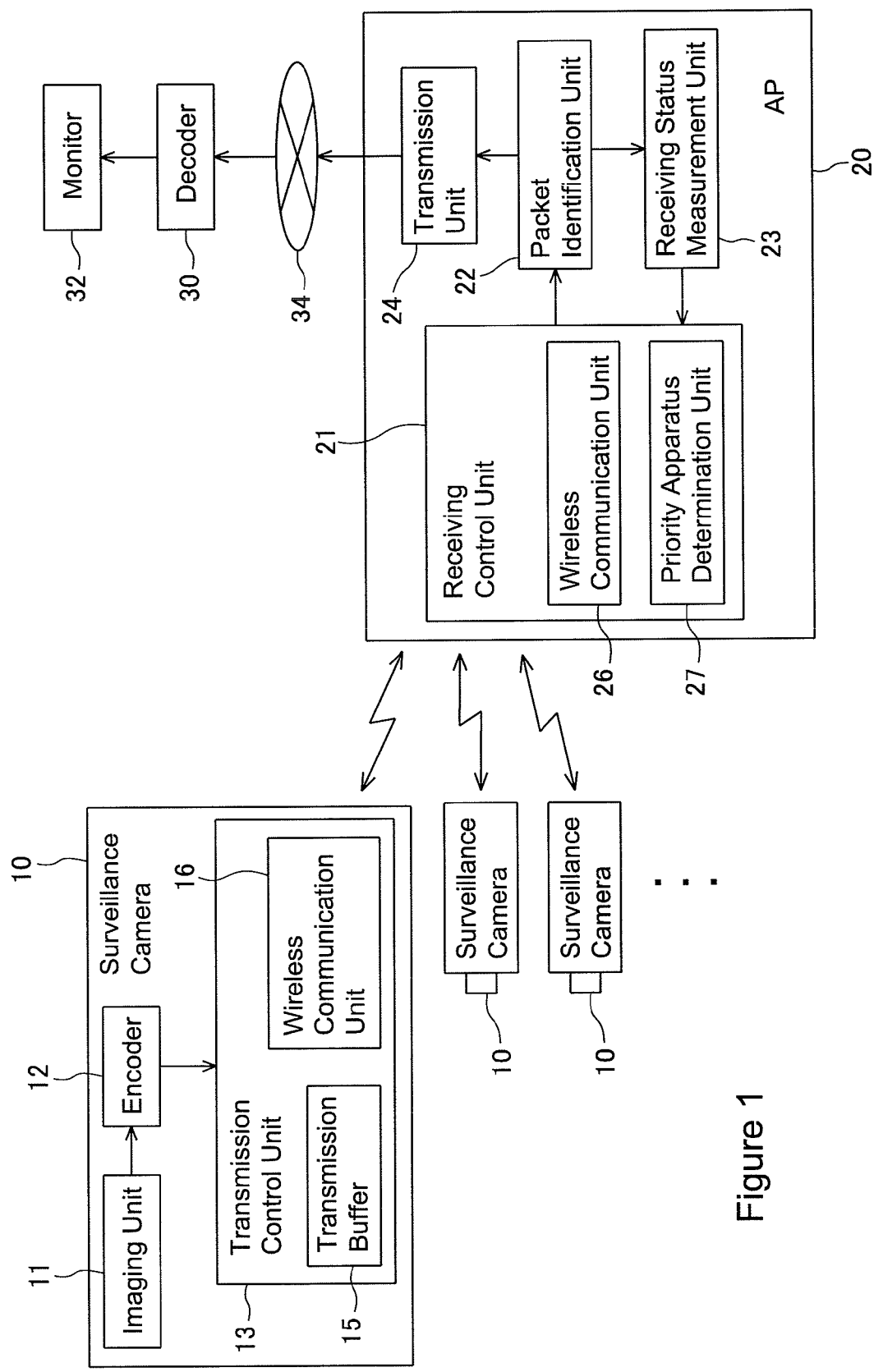
FIG. 1 is a block diagram showing a configuration of a surveillance camera system according to an embodiment.

The system according to embodiments of the present invention will be described with reference to the drawings. FIG. 1 is a block diagram showing a configuration of the system when the present invention is applied to a surveillance camera system. The surveillance camera system includes a plurality of surveillance cameras 10, an access point (AP) 20, a decoder 30, and a monitor 32. In this embodiment, the surveillance cameras 10 and the access point 20 are connected by well-known wireless communication means, and the access point 20 and the decoder 30 are connected through a wire communication network.

In the present invention, more than one access points 20 may be provided, and in such case, the configuration between the single access point and plural surveillance cameras connectable to that access point is similar to the configuration shown in FIG. 1. In addition, the surveillance camera 10 can be movable, and in that case, the configuration between a single access point and plural surveillance cameras connectable to that access point (except the surveillance camera during handover) is similar to the configuration shown in FIG. 1.

The surveillance camera 10, as the transmitting apparatus according to the present invention, includes an imaging unit 11, an encoder 12, and a transmission control unit 13. The imaging unit 11 is, for example, a camera with a CMOS sensor and continuously takes an object to be monitored to output image data at, for example, 30 frames per second. The encoder 12 compresses the bandwidth of the image data input from the imaging unit in a predetermined format, such as H.264, and outputs the image data to the transmission control unit 13.

The transmission control unit 13 divides the compressed image data input from the encoder 12 into UDP packets (hereinafter, simply "packets") in a predetermined size and adds identification information (ID information) of the surveillance camera to the packets. The transmission control unit 13 includes a transmission buffer 15 that temporarily stores image data received from the encoder 12, and a wireless communication unit 16. The wireless communication unit 16, compliant with wireless communication standards such as IEEE 802.11g and IEEE 802.11b, transmits and receives packets to and from the access point 20.

The transmission control unit 13 transmits packets to the access point 20, and controls transmission of the packets as described later when receiving a CTS packet from the access point 20.

The access point 20 includes a receiving control unit 21, a packet identification unit 22, a receiving status measurement unit 23, and a transmission unit 24. The access point 20 is equivalent to a receiving apparatus of the present invention.

The receiving control unit 21 includes a wireless communication unit 26 and a priority apparatus determination unit 27. The receiving control unit 21 transmits and receives various data, such as packets and CTS packets, to and from the surveillance cameras 10. The wireless communication unit 26, with a similar configuration to that of the wireless communication unit 16 of the surveillance camera 10, receives packets from the surveillance cameras 10 and transmits CTS packets to the surveillance cameras 10.

When an RTS packet is received from the surveillance camera 10, the receiving control unit 21 determines whether the packets from this surveillance camera 10 can be received. If the packets can be received, the receiving control unit 21 transmits a CTS packet, indicating that the receiving is possible, to all of the surveillance cameras 10. The CTS packet includes an NAV (Network Allocation Vector) as information indicating the ID information of the surveillance camera 10 that can transmit the packet and indicating time that the packet from that surveillance camera 10 can be received.

The packet identification unit 22 detects the ID information of the surveillance camera 10 indicating the sender of the packet output from the receiving control unit 21 and transmits the information of the ID information to the receiving status measurement unit 23. The packet identification unit 22 also outputs the received packet to the transmission unit 24.

The receiving status measurement unit 23 retrieves the information of the ID information received from the packet identification unit 22, and measures, for each surveillance camera, the receiving speed of the packets based on the number of packets received in a predetermined period or the data amount received in a predetermined period.

It is noted that the present invention is not limited to the embodiment wherein the receiving status measurement unit 23 monitors receiving status by measuring the receiving speed of data from the surveillance camera. It is possible, for example, to utilize radio wave receiving status (RSSI (Received Signal Strength Indication)) for each surveillance camera, and the header information of the RTP packet. The header information of the RTP packet includes a timestamp and a marker bit, and in the event of using the timestamp, it is possible to monitor the delay status of the data stream by detecting increase in the timestamp. When using the marker bit, since the marker bit for the last packet of the transmission picture is set "1", so it is possible to monitor the receiving status by detecting the timing when the marker bit becomes "1", and calculating the number of the transmitted picture in a predetermined period. The receiving status measurement unit 23 can monitor the receiving status by use of one or plural of the information.

The priority apparatus determination unit 27 determines whether the receiving of the packets from the surveillance cameras 10 is delayed based on the receiving speed information of packets stored in the receiving status measurement unit 23 and based on reference speed information described later.

FIG. 2 shows an example of the information of the receiving speed measured by the receiving status measurement unit 23. Here, "Reference speed" denotes a reference value of the receiving speed of the packets from the surveillance camera 10 to prevent delay in the image data transmitted to the decoder 30. The reference speed is set for each surveillance camera 10. As a result, it is possible to set different reference speeds according to the characteristics of the surveillance cameras 10, such as by setting a high reference speed for a high-definition surveillance camera 10.

In the example of FIG. 2, the receiving speed is greater than the reference speed in the surveillance camera with the ID information "001", so the receiving of the packets is not delayed. On the other hand, the receiving speed is smaller than the reference speed in the surveillance camera with the ID information "002", so it can be recognized that the receiving of the packets from the surveillance camera is delayed.

The priority apparatus determination unit 27 determines that the receiving of the packets from the corresponding surveillance camera 10 is delayed when the actual receiving speed is below the reference speed, and set such surveillance camera 10 as a priority apparatus. To preferentially receive the delayed packets from the surveillance camera 10 (priority apparatus), the receiving control unit 21 generates a CTS packet including the ID information and the NAV of the surveillance camera 10 and transmits the CTS packet to all of the connected surveillance cameras 10. The value of the NAV is determined in consideration of factors, such as a difference between the receiving speed and the reference speed of the surveillance camera 10 with delay, and presence or absence of other surveillance cameras with delay. If the receiving packets from a plurality of surveillance cameras 10 are delayed, the CTS packets are transmitted so as to receive packets from the surveillance camera 10 with the largest delay (with the largest difference between the receiving speed and the reference speed).

The transmission unit 24 transmits the packets input from the packet identification unit 22 to the decoder 30 through the communication network 34. The decoder 30 includes, for example, the same number of decoding apparatuses as the number of surveillance cameras 10. The decoder 30 concurrently decodes the packets transmitted from the plurality of surveillance cameras 10 to restore the image data and combines the restored image data to output one image data. The monitor 32 receives the image data from the decoder 30 to output and display the video to thereby divide and output the images from the plurality of surveillance cameras 10.

Figure 3:
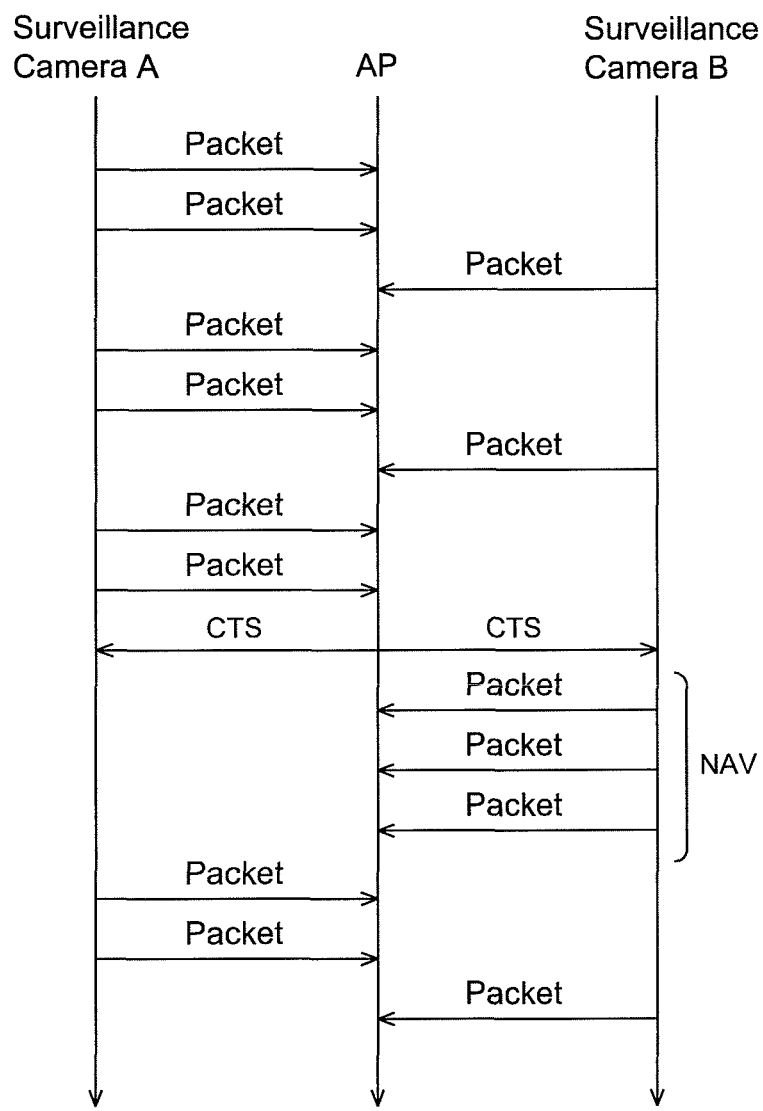
FIG. 3 is an explanatory diagram showing an example of transmission of packets from a plurality of surveillance cameras.

A process of controlling transmission and receiving of packets between the plurality of surveillance cameras 10 and the access point 20 will be described with reference to FIG. 3. In the example of FIG. 3, transmission and receiving of packets between two surveillance cameras (surveillance cameras A and B) and an access point will be described for the purpose of simplifying the drawing. At the connection with the surveillance cameras 10, the access point 20 acquires the reference speed information of the surveillance cameras 10 and stores the reference speed information in the receiving status measurement unit 23.

When the surveillance camera system is activated, the surveillance cameras 10 take images of the object to be monitored, and the packets obtained by imaging are transmitted from the surveillance cameras A and B to the access point 20 in real time manner.

The access point 20 receives the transmitted packets and transmits the packets to the decoder 30 through the transmission unit 24. The packet identification unit 22 in the access point 20 detects the ID information of the surveillance camera indicating the sender of the packets and transmits the information to the receiving status measurement unit 23. The receiving status measurement unit 23 measures the receiving speed of the packets based on the number of received packets from each surveillance camera 10, every certain time.

If there is a surveillance camera 10 in which the receiving speed of packets is smaller than the minimum speed (the surveillance camera B in the example of FIG. 3), the priority apparatus determination unit 27 determines to preferentially receive the packets from the surveillance camera 10 and sets an NAV indicating the time for preferentially receiving the packets. The receiving control unit 21 transmits a CTS packet, indicating that the packets from the surveillance camera B will be received, to all of the connected surveillance cameras 10.

When the CTS packet is received, the surveillance camera B continuously transmits packets to the access point 20. On the other hand, when the CTS packets are received, the surveillance cameras other than the surveillance camera B pause the transmission of packets for the time indicated by the NAV. The packets of the monitoring images generated during that time are stored in the transmission buffer 15.

When the priority time (NAV) indicated by the CTS packet has passed, all of the surveillance cameras 10 restart the transmission of the packets, and the access point 20 receives the packets from all of the surveillance cameras 10. When the access point detects that the receiving speed from a surveillance camera 10 is smaller than the minimum speed, the access point transmits the CTS packet to preferentially receive the packets from the surveillance camera.

Figure 4:
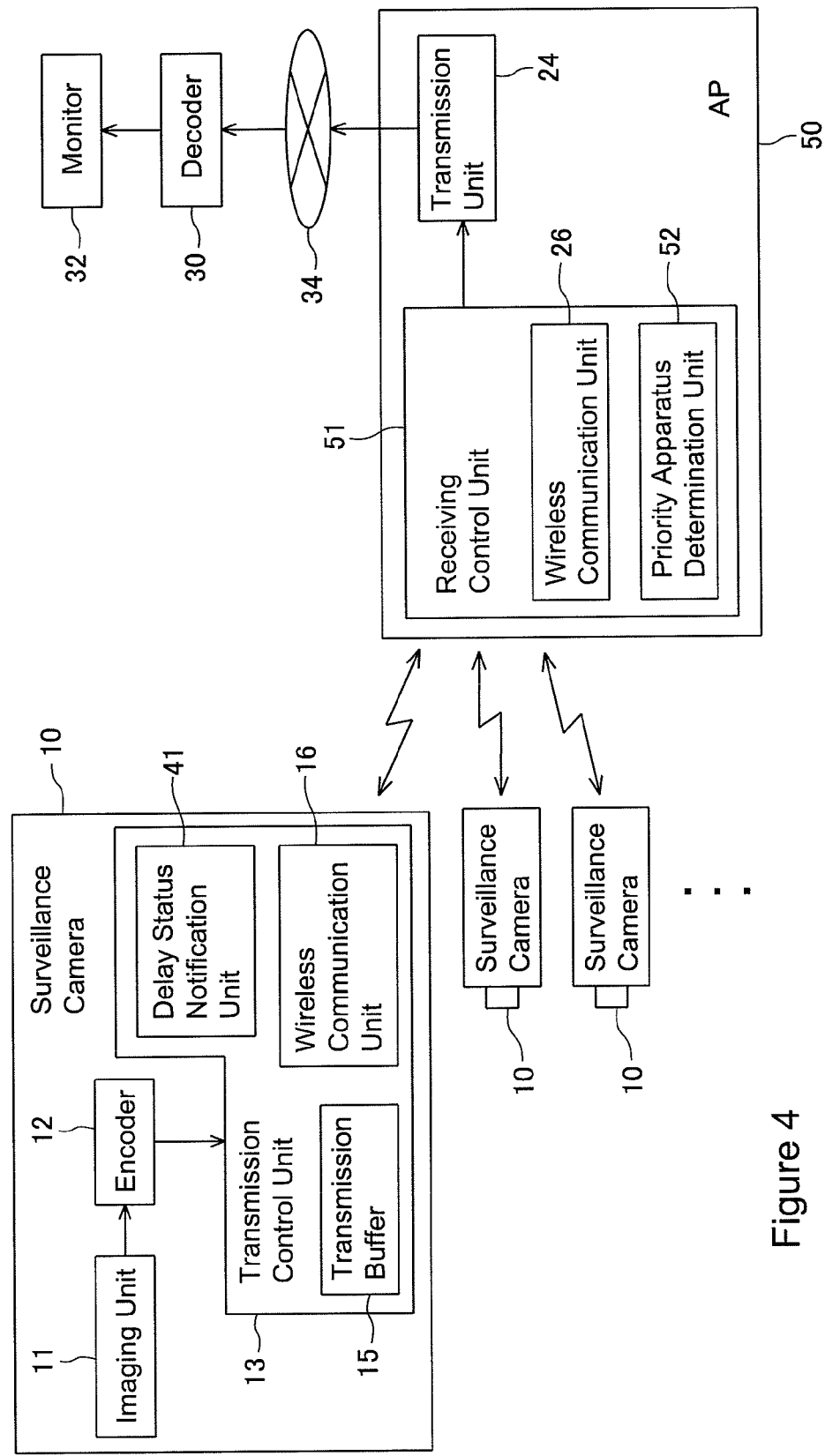
FIG. 4 is a block diagram showing another configuration of the surveillance camera system according to an embodiment.
Figure 5:
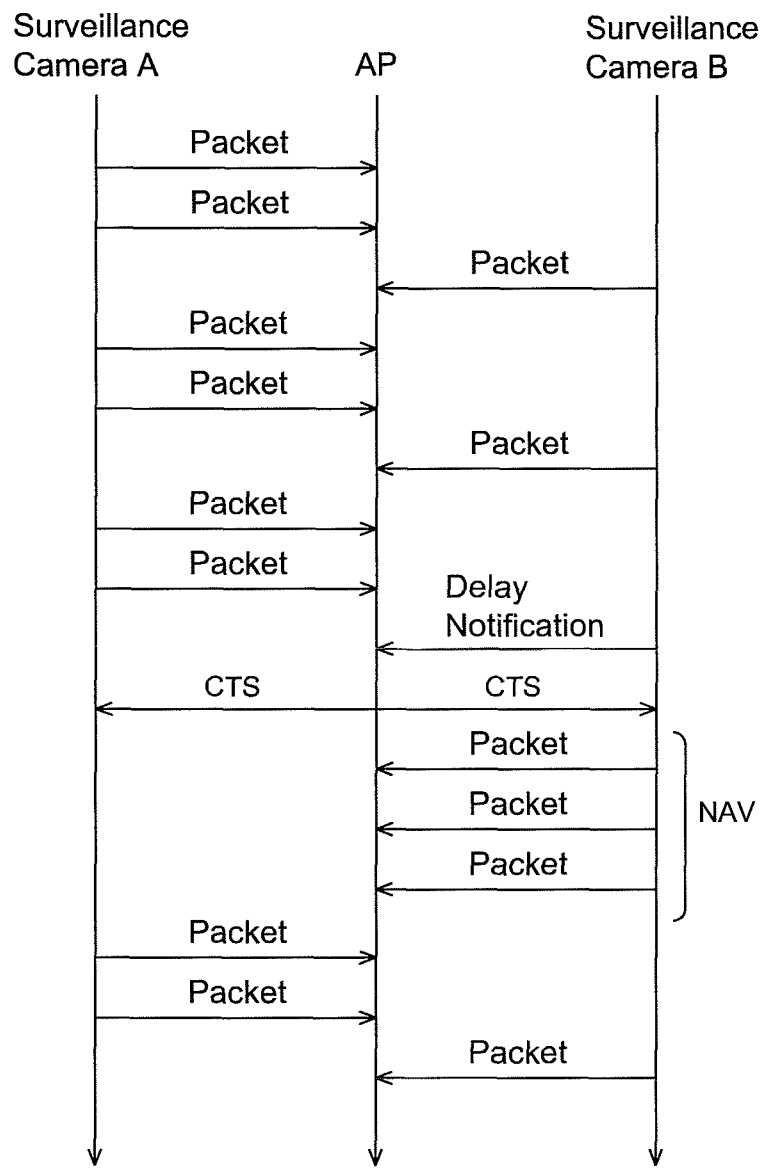
FIG. 5 is an explanatory diagram showing another example of the transmission of packets from a plurality of surveillance cameras.

FIG. 4 shows a configuration of a surveillance camera system according to another embodiment, and FIG. 5 is an explanatory diagram showing a procedure of transmitting packets in the surveillance camera system. In the following description, the same constituent members as those of the embodiment described above are designated with the same reference numerals, and the detailed description will not be repeated.

In the example of FIG. 4, a transmission control unit 13 arranged in a surveillance camera 40 is provided with a delay status notification unit 41 in addition to the transmission buffer 15 and the wireless communication unit 16. The delay status notification unit 41 monitors the transmission speed of the packets transmitted from the surveillance camera 40 to the access point, and when the transmission speed becomes smaller than a predetermined value, determines that the transmission of packets is delayed. In this case, as shown in FIG. 5, the transmission control unit 13 transmits a delay notification packet to an access point 50 to notify the access point 50 of the delay in the transmission.

In FIG. 4, the access point 50 includes a receiving control unit 51 and the transmission unit 24, and the receiving control unit 51 includes the wireless transmission and receiving unit 26 and a priority apparatus determination unit 52. When the delay notification packet is received from the surveillance camera 40, the priority apparatus determination unit 52 determines whether to preferentially receive packets from the surveillance camera 40. The receiving control unit 51 transmits a CTS packet to all of the surveillance cameras 40 (see FIG. 5), the CTS packet including the ID information of the surveillance camera from which the packets will be preferentially received and including the priority receiving period (NAV).

In the example of FIG. 5, the surveillance camera B that has received the CTS packet continuously transmits packets to the access point 50. On the other hand, when the CTS packets are received, the surveillance cameras other than the surveillance camera B pause the transmission of packets for the time indicated by the NAV. The packets of the monitoring images generated during that time are stored in the transmission buffer 15.

When the priority time (NAV) indicated by the CTS packet has passed, all of the surveillance cameras 40 restart the transmission of packets, and the access point 50 receives the packets from all of the surveillance cameras 40.

According to the configuration, the receiving speed of packets from the surveillance camera B exceeds the minimum speed, and the monitoring images received from a plurality of surveillance cameras can be synchronized. Therefore, the deviation in the received monitoring images can be prevented.

According to the configuration, the surveillance camera from which the packets will be preferentially received is determined according to the status of transmission and receiving of packets. Therefore, a preliminary process of synchronizing the time between the wireless terminals is not necessary. The efficiency of process can be improved, and the system can be simplified. In addition, the timing of the packets transmitted from a plurality of surveillance cameras to the access point are synchronized, a buffer for holding the received packets is not necessary in the decoder and/or the monitor. If the transmission speed of a surveillance camera becomes slow, the packets are preferentially transmitted, so it is possible to reduce the size of the buffer for holding the packets in the surveillance camera.

According to the configuration, the packets transmitted from the plurality of surveillance cameras to the access point are synchronized. Therefore, even in a case in which, for example, a decoder is arranged for each monitor and a plurality of monitors individually display the monitoring images, the deviation of time in the screens displayed on the plurality of monitors can be prevented.

The series of processes described above can be executed by hardware or can be executed by software. When the software executes the processes, the processes can be executed by installing a program constituting the software on a computer from a program storage medium storing the program.

Although the packets generated by the surveillance cameras are transmitted in real time in the example described in the embodiments, the present invention can be equally applied to a case in which the surveillance cameras transmit RTS packets in the transmission of the packets.

Although the image data obtained in imaging by the plurality of surveillance cameras is transmitted to the access point in the example described in the embodiments, the present invention is not limited to this. For example, the present invention can be equally applied to a case in which audio data is synchronized in a conversational system.

As described, the wireless communication system of the present invention can synchronize data transmitted from a plurality of wireless terminals based on a simple configuration. For example, the wireless communication system of the present invention is useful as a surveillance camera system, a method, and a program for transmitting image data of monitoring images taken by a plurality of surveillance cameras.

Preferred embodiments of the present invention that are currently conceivable are described above, but it is understood that various modifications are possible for the present embodiment, and every such modification within the true spirit and scope of the present invention is intended to be included in the appended claims.

The invention claimed is:

1. A receiving apparatus comprising,
   a receiver that receives data transmitted from a plurality of transmitters in parallel;
   a monitor that determines, per a certain time period, whether a priority transmitter, whose transmission of data is delayed such that a difference between a reception speed corresponding to the priority transmitter and a predetermined reference speed assigned to the priority transmitter provides a negative reception speed value, is included among the transmitters based on receiving status of the data; and
   a controller that, in response to expiration of each of certain time periods, transmits control data to the transmitters when the priority transmitter is determined to be included, the control data instructing the transmitters other than the priority transmitter to suspend transmission of data for a predetermined time period while allowing the priority transmitter to transmit data during the predetermined time period, and withholds transmission of the control data to the transmitters when there is no transmitter whose difference between the reception speed and the reference speed provides a negative reception speed value,
   wherein the monitor identifies, as the priority transmitter, a transmitter whose difference between its reception speed and the reference speed provides a largest negative reception speed value among the transmitters.

2. The receiving apparatus according to claim 1, wherein, the receiving status is based on at least one of a receiving speed of the data, a radio wave receiving status and header information included in a packet of the data.

3. The receiving apparatus according to claim 1, wherein the transmitters are cameras, each of which captures a video image,
   the data transmitted from the transmitters includes data of the video image, and
   the predetermined reference speed is set, such that the video image to be reproduced at a display of the receiving apparatus is reproduced without delay when the data of video image is received at a reception speed indicated by the predetermined reference speed.

4. The receiving apparatus according to claim 1, wherein, the transmitters are cameras, each of which captures a video image,
   the data transmitted from the transmitters includes data of the video image, and
   the receiving apparatus further comprises a display that displays video images received from all of the cameras simultaneously.

5. A method comprising:
   receiving data transmitted from a plurality of transmitters in parallel;
   determining, per a certain time period, whether a priority transmitter, whose transmission of data is delayed such that a difference between a reception speed corresponding to the priority transmitter and a predetermined reference speed assigned to the priority transmitter provides a negative reception speed value, is included among the transmitters based on receiving status of the data;
   identifying, as the priority transmitter, a transmitter whose difference between its reception speed and the reference speed provides a largest negative reception speed value among the transmitters; and
   in response to expiration of each of certain time periods, transmitting control data when the priority transmitter is determined to be included, the control data instructing the transmitters other than the priority transmitter to suspend transmission of data for a predetermined time period while allowing the priority transmitter to transmit data during the predetermined time period, and
   withholding transmission of the control data when there is no transmitter whose difference between the reception speed and the reference speed provides a negative reception speed value.

6. A tangible non-transient computer readable storage medium that stores a computer program, the computer program, when executed by a processor, causing a processor to perform a process comprising:
   receiving data transmitted from a plurality of transmitters in parallel;
   determining, per a certain time period, whether a priority transmitter, whose transmission of data is delayed such that a difference between a reception speed corresponding to the priority transmitter and a predetermined reference speed assigned to the priority transmitter provides a negative reception speed value, is included among the transmitters based on receiving status of the data;
   identifying, as the priority transmitter, a transmitter whose difference between its reception speed and the reference speed provides a largest negative reception speed value among the transmitters; and
   in response to expiration of each of certain time periods, transmitting control data when the priority transmitter is determined to be included, the control data instructing the transmitters other than the priority transmitter to suspend transmission of data for a predetermined time period while allowing the priority transmitter to transmit data during the predetermined time period, and withholding transmission of the control data when there is no transmitter whose difference between the reception speed and the reference speed provides a negative reception speed value.

7. A system comprising:

a plurality of transmitters transmitting data in parallel to a receiving apparatus; and the receiving apparatus comprising:

a receiver that receives data transmitted from the transmitters;

a monitor that determines, per a certain time period, whether a priority transmitter, whose transmission of data is delayed such that a difference between a reception speed corresponding to the priority transmitter and a predetermined reference speed assigned to the priority transmitter provides a negative reception speed value, is included among the transmitters based on receiving status of the data; and a controller that, in response to expiration of each of certain time periods, transmits control data to the transmitters when the priority transmitter is determined to be included, the control data instructing the transmitters other than the priority transmitter to suspend transmission of data for a predetermined time period while allowing the priority transmitter to transmit data during the predetermined time period, and withholds transmission of the control data to the transmitters when there is no transmitter whose difference between the reception speed and the reference speed provides a negative reception speed value, wherein the monitor identifies, as the priority transmitter, a transmitter whose difference between its reception speed and the reference speed provides a largest negative reception speed value among the transmitters.

8. A system including a receiving apparatus and a plurality of transmitting apparatuses, wherein, the receiving apparatus comprises, a receiver that receives data transmitted from a plurality of transmitting apparatuses in parallel;

a monitor that determines, per a certain time period, whether a priority transmitting apparatus, whose transmission of data is delayed such that a difference between a reception speed corresponding to the priority transmitting apparatus and a predetermined reference speed assigned to the priority transmitting apparatus provides a negative reception speed value, is included among the transmitting apparatuses based on receiving status of the data, and identifies, as the priority transmitter, a transmitter whose difference between its reception speed and the reference speed provides a largest negative reception speed value among the transmitters; and a controller that, in response to expiration of each of certain time periods, transmits control data to the transmitting apparatuses when the priority apparatus is determined to be included, the control data instructing the transmitting apparatuses other than the priority apparatus to suspend transmission of data for a predetermined time period while allowing the priority apparatus to transmit data in the predetermined time period, and withholds transmission of the control data to the transmitting apparatuses when there is no transmitting apparatus whose difference between the reception speed and the reference speed provides a negative reception speed value, and each of the transmitting apparatus comprises, a transmitter that transmits data to the receiving apparatus;

a receiver that receives the control data when the control data is transmitted from the receiving apparatus; and a controller that, when the control data is received by a transmitting apparatus among the transmitting apparatuses other than the priority apparatus, controls the transmitter to suspend the transmission of data for the predetermined time period, and when the each of the transmitting apparatuses is the priority apparatus, controls the transmitter to continue transmission of data to the receiving apparatus during the predetermined time period.

9. A system including receiving apparatuses and transmitting apparatuses, wherein, each of the receiving apparatuses comprises, a receiver that receives data transmitted from a plurality of transmitting apparatuses in parallel;

a monitor that determines, per a certain time period, whether a priority transmitting apparatus, whose transmission of data is delayed such that a difference between a reception speed corresponding to the priority transmitting apparatus and a predetermined reference speed assigned to the priority transmitting apparatus provides a negative reception speed value, is included among the transmitting apparatuses based on receiving status of the data, and identifies, as the priority transmitter, a transmitter whose difference between its reception speed and the reference speed provides a largest negative reception speed value among the transmitters; and a controller that, in response to expiration of each of certain time periods, transmits control data to the transmitting apparatuses when the priority apparatus is determined to be included, the control data instructing the transmitting apparatuses other than the priority apparatus to suspend transmission of data for a predetermined time period while allowing the priority apparatus to transmit data during the predetermined time period, and withholds transmission of the control data to the transmitting apparatuses when there is no transmitting apparatus whose difference between the reception speed and the reference speed provides a negative reception speed value, and each of the transmitting apparatus comprises, a transmitter that transmits data to the receiving apparatus;

a receiver that receives the control data when the control data is transmitted from the receiving apparatus; and a controller that, when the control data is received by a transmitting apparatus among the transmitting apparatuses other than the priority apparatus, controls the transmitter to suspend the transmission of data for the predetermined time period, and when the each of the transmitting apparatuses is the priority apparatus, controls the transmitter to continue transmission of data to the receiving apparatus during the predetermined time period.

10. A method for a system including a receiver and a plurality of transmitters, the method comprising, transmitting data by each of the transmitters, receiving data transmitted from the transmitters in parallel;

determining, per a certain time period, whether a priority transmitter, whose transmission of data is delayed such that a difference between a reception speed corresponding to the priority transmitter and a predetermined reference speed assigned to the priority transmitter provides a negative reception speed value, is included among the transmitters based on receiving status of the data;

identifying, as the priority transmitter, a transmitter whose difference between its reception speed and the reference speed provides a largest negative reception speed value among the transmitters;

in response to expiration of each of certain time periods, transmitting control data to the transmitters when the priority transmitter is determined to be included, the control data instructing the transmitters other than the priority transmitter to suspend transmission of data for a predetermined time period while allowing the priority transmitter to transmit data during the predetermined time period, and withhold transmitting the control data to the transmitters when there is no transmitter whose difference between the reception speed and the reference speed provides a negative reception speed value;

receiving, by each of the transmitters, the control data when the control data is transmitted; and suspending, the transmission of data from each of the transmitters other than the priority transmitter for the predetermined time period, and continuing to transmit data from the priority transmitter during the predetermined time period when the control data is received by the transmitters.

11. The receiving apparatus according to claim 1, wherein the control data instructs the transmitters other than the priority transmitter to restart transmission of the data after the predetermined time period has passed.

12. The method according to claim 5, further comprising: restarting transmission of the data after the predetermined time period has passed.

13. The receiving apparatus according to claim 1, wherein the receiving apparatus receives, without a buffer, the data transmitted from the plurality of transmitters.

* * * * *